Patented May 13, 1952

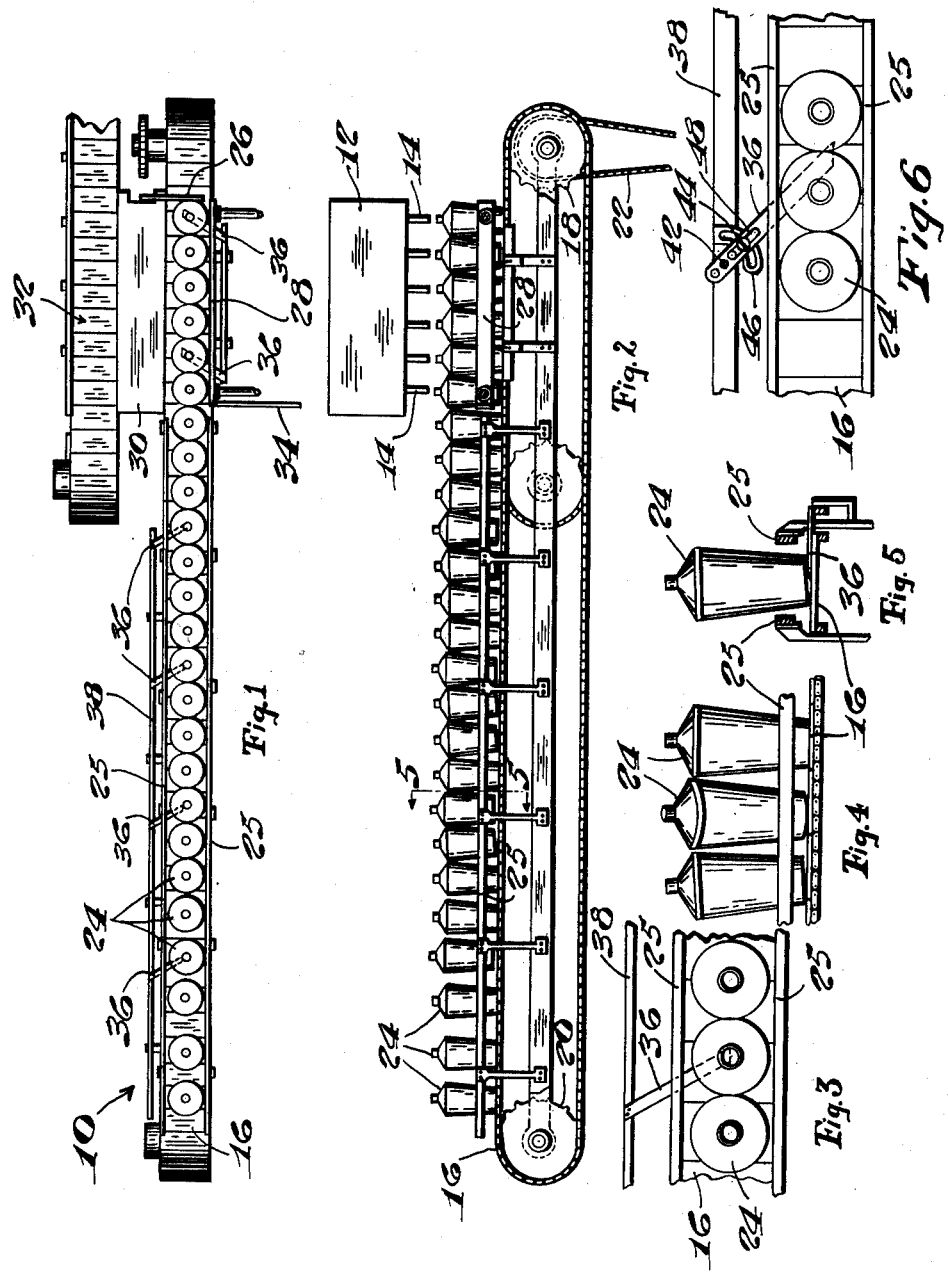

2,596,615

UNITED STATES PATENT OFFICE 2,596,615

CONVEYER

Walter S. Sterling, Quincy, Mass., assignor to Pneumatic Scale Corporation, Limited, Quincy, Mass., a corporation of Massachusetts Application October 26, 1949, Serial No. 123,593

8 Claims. (Cl. 198—19)

This invention relates to a conveyor and more particularly to a conveyor for handling containers of the type wherein the upper portion of the body of the container is substantially larger than the base, such for example as downwardly tapered bottles.

The invention has for an object to provide a novel and improved conveyor for efficiently handling containers of the type specified and for preventing the containers from crowding together and tipping over when the containers are brought to rest on the moving conveyor.

With this general object in view, and such others as may hereinafter appear, the invention consists in the conveyor for handling containers of the type of downwardly tapered bottles and in the various structures, arrangements and combinations of parts hereinafter described and particularly defined in the claims at the end of this specification.

In the drawings illustrating the preferred embodiment of the invention, Fig. 1 is a plan view of a conveyor embodying the present invention; Fig. 2 is a side elevation of the same; Figs. 3 and 4 are detail views in plan and side elevation respectively of a portion of the conveyor shown in Fig. 1; Fig. 5 is a cross-sectional view taken on the line 5—5 of Fig. 2; and Fig. 6 is a plan view, similar to Fig. 3, illustrating a modified form of the present conveyor.

In general, the present invention contemplates a novel conveyor for handling those types of containers having enlarged upper portions and smaller base portions such as downwardly tapered bottles, as for example conical or pyramidal shaped bottles having downwardly and inwardly tapering sides. The invention finds particular use in a conveyor for supplying a line of such containers in an upright position and in contiguous relation to a bottling machine wherein the conveyor belt is continuously moving and the foremost bottle in the line engages a fixed stop to bring the line to rest and to present a group of bottles at the forward end of the line in operative position to the bottle filling machine. Prior to the present invention, difficulty has been encountered in conveying such tapered bottles and containers and particularly bottles having inwardly tapering sides with the small ends of the tapers at the bottoms of the bottles and the large ends of the tapers in contiguous engagement at the top. In such instances, the frictional drag or traction of the continuously moving conveyor belt on the bottoms of the bottles, when the line is brought to rest, causes the smaller lower ends of the bottles to be rocked forwardly, pivoting at the upper contiguous edges of the tapers until the lower ends of the bottles come together thus causing the endmost bottles in the line to be inclined sufficiently to cause them to tip over longitudinally and rearwardly of the conveyor. Sometimes this causes collapse of the entire line.

In accordance with the present invention, in order to avoid such difficulty, a plurality of thin stationary plates or narrow metal strips are mounted at suitably spaced intervals along the conveyor. In practice the spacing may correspond to every fourth bottle. The strips are arranged to extend across and adjacent to the upper surface of the conveyor, and during normal operation of the conveyor the bottles may normally ride over the strips and pass along with the conveyor. When the foremost bottle in the line engages a fixed stop to bring the line to rest, selected of the bottles come to rest on the stationary strips, such bottles being maintained in a slightly raised position and the frictional engagement of the continuously moving conveyor belt is diminished to such an extent as to prevent the traction of the belt on the intervening bottles from causing them to be moved into such rearwardly inclined positions as to tip over with the result that bottles are maintained in their upright positions during continued movement of the conveyor belt.

Referring now to the drawings, the invention is herein illustrated as embodied in a conveyor 10 comprising a continuously operated supply conveyor for supplying a line of bottles in an upright position and in contiguous relation to a bottle filling machine, diagrammatically indicated at 12, the bottle filling machine being provided with a plurality of filling nozzles 14 arranged for operative engagement with the foremost group of bottles in the line. The conveyor 10 may and preferably will include a metal link type of belt 16 arranged to run over a driving sprocket 18 and an idler sprocket 20, the driving sprocket 18 being continuously rotated by a chain and sprocket drive connection, indicated generally at 22.

In operation, the bottles 24 may be supplied to the conveyor 10 either manually or by any usual or preferred bottle feeding mechanism, the bottles being delivered to the conveyor either singly or in groups and in indiscriminately spaced relation. During the operation of the machine, the bottles are advanced along the continuously moving conveyor between guide rails 25 until the foremost bottle engages a fixed stop 26 to come to rest on the conveyor, succeeding bottles in spaced relation being advanced until they contact the preceding bottles in contiguous engagement thus bringing the entire line to rest on the continuously moving belt 16.

As herein shown, the bottle filling machine 12 is provided with a plurality of filling nozzles 14, herein shown as six filling nozzles spaced in accordance with the pitch distance between adjacent contiguous bottles whereby to permit simultaneous filling of the group of six foremost bottles in the line, and during continued operation of the machine, when the filling operation is completed, the group of filled bottles is removed transversely of the conveyor by a pusher plate 28 arranged to transfer the group across a bridge plate 30 and onto a discharge conveyor 32 for delivering the group of filled bottles to a subsequent machine, such as a bottle closure applying machine. The pusher plate 28 is provided with a right angle extension 34 for holding the remainder of the line of bottles at rest on the conveyor during the transferring operation, and upon return of the pusher plate to its retracted position, the entire line of bottles 24 is again permitted to advance to present a succeeding group of foremost bottles in operative alignment with the bottle filling machine.

As above stated, difficulty has been encountered when attempting to convey tapered bottles into operative relation to the filling machine because of the frictional drag or traction of the belt on the bottoms of the bottles when the latter are brought to rest, the continued movement of the conveyor belt operating to cause the bottles in the line to assume rearwardly inclined positions, to the extent permitted by the taper of the bottles, in some instances inclining the bottles sufficiently to cause tipping of the bottles and collapse of the line. In order to avoid this difficulty provision is made for eliminating or substantially reducing the traction on the bottoms of selected spaced bottles in the line, such selected bottles not being subject to the full influence of the conveyor belt when the line comes to rest and serving to counteract the influence of the conveyor on the bottles intervening between such selected bottles and to enable the entire line to assume an upright position. As herein shown, this effect may be accomplished by the provision of a series of stationary "dead" plates comprising relatively thin narrow metal strips 36 arranged to extend part way across the moving conveyor belt at an appropriate angle relative to the longitudinal axis of the belt and inclined in the direction of movement of the belt. The relatively thin strips 36 are arranged at suitably spaced intervals along the conveyor as, for example, so as to be spaced at every fourth of the contiguous bottles and substantially in engagement with the upper surface of the belt so that, in operation, the bottles may ride up and over the thin strips when the line is permitted to advance, the bottles passing over the strips being pushed along with the line by the succeeding containers which have their lower ends in full engagement with the belt. However, when the line is brought to rest by engagement of the foremost bottle with the fixed stop 26, those bottles coming to rest on the stationary plates 36 are raised or partially raised so as to prevent most of their contact with the moving conveyor belt, the spacing of the stationary plates along the conveyor being such as to support the intervening bottles in their upright position, thus preventing tipping of the bottles and assuring alignment of the foremost group of contiguous bottles with the filling nozzles 14.

In practice, the length, spacing and angularity of the stationary plates 36 may vary in accordance with the size, shape, stability and degree of taper of the bottles and, as herein shown, the stationary plates 36 may be mounted on an auxiliary rail 38 attached to one side of the conveyor, such rail being interchangeable with a second rail provided with plates 36 of different length, spacing and angularity when a different set of bottles is to be run on the conveyor. As illustrated in Fig. 6, the stationary strips 36 may also be mounted for adjustment on the auxiliary rail 38 as by pivotally mounting the strip at 42 and swinging the strip to the desired angle by means of a bolt 44 operating in a slotted member 46. The strip 36 may also be provided with additional pivot points and an elongated slot 48 for longitudinal extension of the strip to different lengths across the conveyor belt.

It has been found in practice that the angle of the relatively thin stationary plate 36 relative to the longitudinal axis of the conveyor, and in the direction of movement thereof, must be such as to permit the oncoming bottles to ride gently and gradually up onto the plate without any tripping action, such angle being approximately in the vicinity of 45 degrees more or less as determined by the particular bottle being run. The length of the stationary plate 36 is preferably such that at least a portion of the bottom of the bottle passing thereover be capable of engagement with the moving belt whereby to provide sufficient traction to permit a single bottle, not influenced by pressure of succeeding bottles, to pass over the plate and be advanced along with the conveyor belt, such length varying in accordance with the bottle being run from a distance extending one quarter to three quarters of the width of the conveyor belt. Thus, in operation, the bottle passing over the plate may be slightly tilted to one side with one edge of the bottom on the plate and the opposite edge in engagement with the belt, the effect of the stationary plate being such as to temporarily interrupt or delay but not entirely imped the progress of the bottle along the conveyor.

The spacing of the stationary plates 36 is also determined by the degree of taper and other characteristics including the stability of the bottles being conveyed, the spacing preferably being such as to provide a plate under the last one of a predetermined multiple of bottles when the line is brought to rest, the plates being herein shown as disposed under every fourth or fifth bottle. For example, two or three bottles in a line may not receive sufficient total traction to effect tipping of the bottles, but succeeding bottles coming into contiguous engagement with such line provide additional traction which may effect tipping of the last bottle and collapse of the line. Hence, in practice, the plates 36 are placed close enough together to prevent such action regardless of the number of bottles in the line, that is, whether the conveyor is filled or only partially filled with bottles. Thus, in operation of the conveyor, when the line is brought to rest, the selected bottles will be in a slightly raised or laterally tilted position and with their upper or wider ends in contiguous engagement with adjacent bottles, thus reducing to a minimum the tractional effect of the conveyor belt on such selected bottles and serving to support the intervening bottles in an upright position.

From the above description it will be observed that the present stationary plates 36 associated with a continuously moving conveyor serve to at least partially relieve the bottles of the tractional effect of the conveyor when the bottles are brought to rest whereby to reduce to a minimum the tendency of tapered bottles to crowd or converge together at their lower or narrower ends during the continued operation of the conveyor, and without materially impeding the progress of the line of bottles when permitted to advance with the conveyor belt.

While the preferred embodiment of the invention has been herein illustrated and described, it will be understood that the invention may be embodied in other forms within the scope of the following claims.

Having thus described the invention, what is claimed is:

1. A conveyor for handling containers of the type having the upper portion of the body portion enlarged with respect to the base portion, including a continuously moving conveyor belt adapted to convey a line of containers in an upright position and with their upper portions in contiguous relation, and means engageable with the bottoms of the containers for substantially reducing the traction of the belt on the bottoms of selected of said containers when the line is brought to rest on the continuously moving belt whereby to prevent crowding together of the lower ends of the containers during such continued movement of the conveyor, said traction reducing means comprising a series of relatively thin narrow metal strips extending across and adjacent to the upper surface of the conveyor belt at spaced intervals.

2. A conveyor for handling containers of the type having the upper portion of the body portion enlarged with respect to the base portion, including a continuously moving conveyor belt adapted to convey a line of containers in an upright position and with their upper portions in contiguous relation, and means engageable with the bottoms of the containers for substantially reducing the traction of the belt on the bottoms of selected of said containers when the line is brought to rest on the continuously moving belt whereby to prevent crowding together of the lower ends of the containers during such continued movement of the conveyor, said traction reducing means comprising a series of relatively thin narrow metal strips extending across and adjacent to the upper surface of the conveyor belt at spaced intervals, said strips being extended at an angle inclined in the direction of movement of said belt.

3. A conveyor for handling containers of the type having the upper portion of the body portion enlarged with respect to the base portion, including a continuously moving conveyor belt adapted to convey a line of containers in an upright position and with their upper portions in contiguous relation, and means engageable with the bottoms of the containers for substantially reducing the traction of the belt on the bottoms of selected of said containers when the line is brought to rest on the continuously moving belt whereby to prevent crowding together of the lower ends of the containers during such continued movement of the conveyor, said traction reducing means comprising a series of relatively thin narrow metal strips extending across and adjacent to the upper surface of the conveyor belt at spaced intervals, said strips being extended at an angle inclined in the direction of movement of said belt, and terminating at a point intermediate the width of the belt.

4. A conveyor for handling containers of the type having the upper portion of the body portion enlarged with respect to the base portion, including a continuously moving conveyor belt adapted to convey a line of containers in an upright position and with their upper portions in contiguous relation, and means engageable with the bottoms of the containers for substantially reducing the traction of the belt on the bottoms of selected of said containers when the line is brought to rest on the continuously moving belt whereby to prevent crowding together of the lower ends of the containers during such continued movement of the conveyor, said traction reducing means comprising a series of relatively thin narrow metal strips extending across and adjacent to the upper surface of the conveyor belt at spaced intervals, said strips being extended at an angle inclined in the direction of movement of said belt, and terminating at a point intermediate the width of the belt, to permit at least a portion of the bottom of the container to be in tractional engagement with the belt whereby to permit a single container being conveyed to be advanced over the strips.

5. A conveyor for handling containers of the type having the upper portion of the body portion enlarged with respect to the base portion, including a continuously moving conveyor belt adapted to convey a line of containers in an upright position and with their upper portions in contiguous relation, and means engageable with the bottoms of the containers for substantially reducing traction of the belt on the bottoms of selected of said containers when the line is brought to rest on the continuously moving belt whereby to prevent crowding together of the lower ends of the containers during such continued movement of the conveyor, said traction reducing means comprising a series of relatively thin narrow metal strips extending across and adjacent to the upper surface of the conveyor belt at spaced intervals, said strips being extended at an angle inclined in the direction of movement of said belt, and means for adjusting the angularity and extended length of said strips.

6. A conveyor for handling containers of the type having the upper portion of the body portion enlarged with respect to the base portion, including a continuously moving conveyor belt adapted to convey a line of containers in an upright position and with their upper portions in contiguous relation, and means engageable with the bottoms of the containers for substantially reducing the traction of the belt on the bottoms of selected of said containers when the line is brought to rest on the continuously moving belt whereby to prevent crowding together of the lower ends of the containers during such continued movement of the conveyor, said traction reducing means comprising a series of relatively thin narrow metal strips extending across and adjacent to the upper surface of the conveyor belt at spaced intervals, and means for interchangeably supporting said strips.

7. A conveyor for handling downwardly tapering bottles including a continuously moving conveyor belt upon which a line of the bottles is conveyed in an upright position and in contiguous engagement at their upper ends, means for stopping the line while the conveyor belt continues to run, and means engageable with the lower ends of the bottles for reducing the traction of the belt on the bottoms of selected of said bottles when the line is brought to rest on the continuously moving belt whereby to prevent convergence of the lower ends and tipping of the bottles during such continued movement of the conveyor, said traction reducing means comprising a plurality of relatively thin narrow metal strips angularly extended partway across the upper surface of the conveyor belt at spaced intervals along the conveyor, said strips enabling the bottles to pass thereover when permitted to advance, the selected bottles coming to rest on top of said strips when the line is stopped.

8. A conveyor for handling containers of the type having upper portions larger than their base portions, including a continuously moving conveyor belt adapted to convey a line of said containers in an upright position with their upper portions in contiguous relation, and means disposed at fixed spaced positions along said conveyor for elevating and supporting only a portion of the base of each of the containers at said spaced positions, another portion of the base of each of said containers remaining in frictional contact with said moving conveyor at all times during movement of said containers past said positions.

WALTER S. STERLING.

REFERENCES CITED

The following references are of record in the file of this patent:

UNITED STATES PATENTS

| Number | Name | Date |
| --- | --- | --- |
| 1,030,479 | Ofstad | June 25, 1912 |
| 1,109,284 | Friel | Sept. 1, 1914 |
| 2,296,201 | Carter | Sept. 15, 1942 |
| 2,367,354 | Kanter | Jan. 16, 1945 |
| 2,370,188 | Pellegrino | Feb. 27, 1945 |